United States Patent
Piper

(10) Patent No.: US 7,937,208 B2
(45) Date of Patent: May 3, 2011

(54) APPARATUS FOR MEASURING EGR AND METHOD

(75) Inventor: Erik L. Piper, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 324 days.

(21) Appl. No.: 12/330,565

(22) Filed: Dec. 9, 2008

(65) Prior Publication Data

US 2010/0145598 A1    Jun. 10, 2010

(51) Int. Cl.
*G06F 19/00* (2006.01)
*F02M 25/07* (2006.01)
*F02B 47/08* (2006.01)

(52) U.S. Cl. .................... 701/108; 123/568.21

(58) Field of Classification Search .......... 123/568.11, 123/568.16, 568.21; 701/101–103, 108, 701/114, 115; 73/114.74
See application file for complete search history.

(56) References Cited

U.S. PATENT DOCUMENTS

| | | |
|---|---|---|
| 5,848,580 A | 12/1998 | Mashiki |
| 6,032,656 A | 3/2000 | Itoyama et al. |
| 6,408,834 B1 * | 6/2002 | Brackney et al. ........ 123/568.21 |
| 6,595,191 B2 * | 7/2003 | Braun et al. ............. 123/568.21 |
| 6,877,366 B2 | 4/2005 | Rabl |
| 6,922,987 B2 | 8/2005 | Mital et al. |
| 6,944,532 B2 * | 9/2005 | Bellinger ...................... 701/115 |
| 7,028,680 B2 | 4/2006 | Liu et al. |
| 7,032,578 B2 | 4/2006 | Liu et al. |
| 7,140,357 B2 | 11/2006 | Wei et al. |
| 7,269,497 B2 * | 9/2007 | Schreurs et al. .............. 701/108 |
| 2002/0179060 A1 | 12/2002 | Engel et al. |
| 2004/0084015 A1 | 5/2004 | Sun et al. |
| 2005/0124459 A1 | 6/2005 | Ito |
| 2006/0180122 A1 | 8/2006 | Maekawa et al. |
| 2007/0056266 A1 | 3/2007 | Kurtz |
| 2010/0199639 A1 * | 8/2010 | Matsunaga et al. ........ 73/114.74 |

FOREIGN PATENT DOCUMENTS

| | | |
|---|---|---|
| EP | 2098710 A1 | 9/2009 |
| FR | 2910929 A1 | 7/2008 |
| JP | 2004197615 A * | 7/2004 ............... 123/568.21 |

* cited by examiner

*Primary Examiner* — Willis R Wolfe, Jr.
(74) *Attorney, Agent, or Firm* — Taylor IP, P.C.

(57) ABSTRACT

An air breathing fuel consuming internal combustion engine with EGR and a control for the quantity of EGR. The total gas flow of the engine is calculated by measuring temperature and pressure at the intake to the engine. The fresh air flow is measured by an orifice or venturi at any point in the flow path for fresh air for combustion by the engine prior to the introduction of the EGR flow. The difference between the calculated total flow and fresh air flow is the actual EGR flow which is used to set the EGR relative to total flow according to one of a number of selected control algorithms.

22 Claims, 1 Drawing Sheet

APPARATUS FOR MEASURING EGR AND METHOD

BACKGROUND OF THE INVENTION

1. Field of the Invention

The present invention relates to internal combustion engines with exhaust gas recirculation (EGR) systems and the measurement of EGR flow.

2. Description of the Related Art

One of the essential elements in the over 30-year quest for reducing emissions in the United States has been the use of exhaust gas recirculation or EGR. This is a way in which a selected percentage of products of combustion are recirculated to the intake of an air-breathing, fuel-consuming internal combustion engine to lower combustion temperatures and thus reduce the quantity of oxides of oxygen produced during the combustion process. EGR was initially used on spark ignition gasoline fuel automotive engines. The early EGR approaches, while suppressing oxides of nitrogen, added complexity to the system and otherwise compromised performance and flexibility of the engine with which it is associated.

In succeeding years, the use of EGR has been made significantly more sophisticated with the use of electronic control, oxygen sensors, and other means for closed-loop control of the EGR. In recent years, the application of EGR has been required for compression ignition, or diesel, engines owing to mandatory Environmental Protection Agency (EPA) required reductions in emissions. The application of EGR to diesel engines posed a new challenge for the design of systems, especially in view of the nature of the duty cycle for the diesel engine. Diesel engines, particularly in the off highway field, operate under extremely difficult ambient environments and require control systems for the EGR to be rugged enough to withstand the required engine duty cycle but sufficiently accurate to maintain the required levels of emissions.

In order to control the percentage of EGR relative to the fresh air introduced to the engine, a measurement of EGR flow is required. Currently, such measurement involves either a venturi or orifice positioned within the passage that carries EGR from the exhaust of the engine to the engine intake. While providing some measure of EGR flow, the nature of the gas constituent in the EGR passage is such that it can affect the accuracy of the measurement. Furthermore, the EGR flow passage is subject to significant pressure pulse variations owing to the fact that multicylinder reciprocating internal combustion engines generate discrete exhaust pulses which are reflected in the flow through the EGR passage. This, in turn, can have a significant and adverse effect on the measurement of EGR flow within the EGR passage. In addition to this problem, the use of a venturi or orifice-like restriction in the EGR passage is a direct fuel efficiency penalty since additional pumping work must be done by the engine because of the orifice or venturi restriction.

Accordingly, what is needed in the art is a more effective and accurate measurement of EGR in an internal combustion engine.

SUMMARY OF THE INVENTION

In one form, the invention is a control system for an exhaust gas recirculation (EGR) system of an internal combustion (IC) engine which includes a device for controlling the flow of EGR in response to the differential of at least two input signals. A first device calculates the flow of gasses consumed by the IC engine and provides a signal proportional to the total gas flow to the flow control device. A second device measures the fresh air flow to the IC engine and provides a signal proportional to the fresh air flow to the flow control device so that the difference between the total flow and the fresh air flow is the actual EGR flow.

In another form, the invention is an internal combustion (IC) engine system including an air breathing, IC engine having an intake for receiving gas for combustion and an exhaust for discharging products of combustion. A flow control device selectively fluidly connects a controlled percentage of the products of combustion to the intake of the IC engine. A device actuates the flow control device in response to the differential of at least two input signals. A first device calculates the total flow of gasses consumed by the IC engine and provides a signal proportional to the IC engine total gas flow to the flow control device. A second device measures the fresh air flow to the IC engine and provides a signal proportional to the fresh air flow to the flow control device so that the difference between the total flow and the fresh air flow is the actual EGR flow.

In still another form, the invention is a method of operating an air-breathing, internal combustion (IC) engine having exhaust gas recirculation (EGR) and a device for controlling EGR. The method includes the steps of calculating the total flow of gasses consumed by the IC engine. The actual fresh air flow is subtracted from the total flow to provide a measure of EGR flow which is used as an input to the device for controlling EGR.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

DETAILED DESCRIPTION OF THE INVENTION

Figure 1:
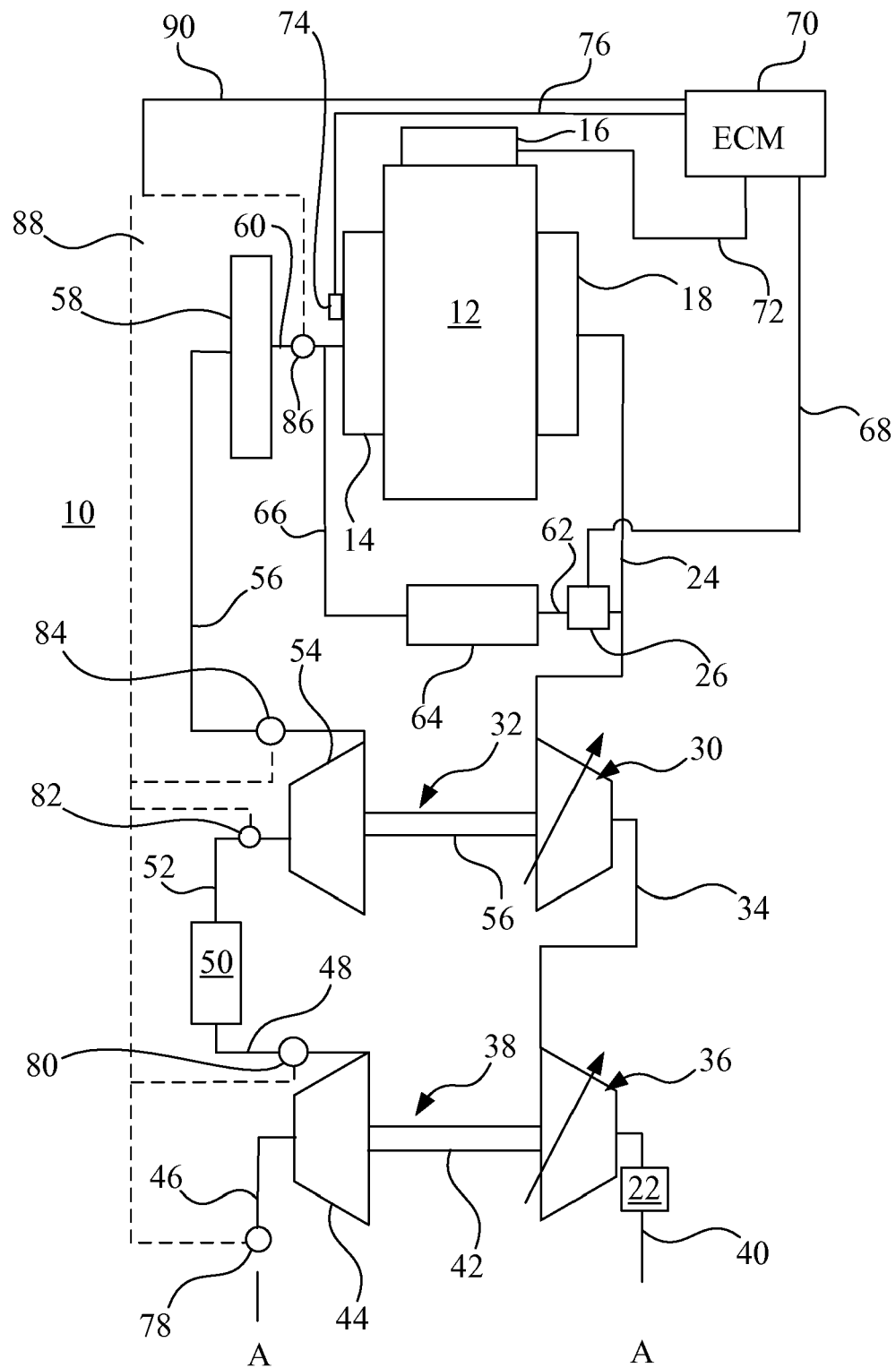
FIG. 1 is a schematic drawing of an internal combustion engine having EGR and which embodies the present invention Corresponding reference characters indicate corresponding parts throughout the several views. The exemplifications set out herein illustrate one embodiment of the invention and such exemplification is not to be construed as limiting the scope of the invention in any manner.

Referring to FIG. 1, there is shown an internal combustion engine system 10 having at its heart an air-breathing, fuel-consuming, multicylinder internal combustion engine 12 that receives combustion air from an intake manifold 14 and has a fuel system 16 supplying fuel for combustion which is discharged through exhaust manifold 18. Internal combustion engine 12 can be a reciprocating type in which pistons reciprocate within cylinders in an appropriate in-line or V configuration and are connected to a crank shaft so that their up and down motion is converted into a rotary torque output.

The engine 12 may utilize any one of a number of operating cycles including a spark ignition engine in which fuel is mixed with combustion air prior to entry in the engine cylinders and ignited by an ignition source. Alternatively, the engine may be a compression ignition or diesel cycle in which the heat of compression is used to ignite fuel that is directly injected into the individual cylinders for combustion. Still another form may be what is referred to as homogenous charge compression ignition engines in which fuel is mixed with the combustion air prior to entry to the cylinder and various parameter controls or devices are used to initiate combustion. With any one of these systems, the products of combustion contain oxides of nitrogen, $CO_2$, and other exhaust components.

The products of combustion are passed through an exhaust conduit 24 leading to a turbine 30 of a high pressure turbocharger 32. The gasses discharged from turbine 30 pass through line 34 to turbine 36 of a low pressure turbocharger 38. The gasses then pass from turbine 36 via line 40 to ambient A. An exhaust after treatment device 22 which typically includes an oxidization catalyst and a particulate filter may be positioned in line 40 as shown or may be located at any point in the exhaust flow path from the engine to ambient A. It should be apparent to those skilled in the art that some form of sound suppression may also be provided in line 40. It should also be apparent that the internal combustion engine system 10 may be employed with or without one or both of the turbochargers 32 and 38 in accordance with the present invention. Furthermore, one or both of the turbocharger turbines 30 and 36 may employ variable geometry, as illustrated by the diagonal arrows, which controls air flow and the EGR fraction.

The low pressure turbocharger 38 has a central shaft 42 connected to drive a compressor 44 which receives fresh air from ambient A via intake line 46. The air thus pressurized by compressor 44 passes through line 48 through an intercooler 50 to line 52. Line 52 provides an inlet for air to compressor 54 of high pressure turbocharger 32 which is driven by turbine 30 through shaft 56.

The output from compressor 54 passes through line 56, an aftercooler 58 and finally through line 60 to intake manifold 14. It should be noted by those skilled in the art that the intercooler 50 and aftercooler 58 may be incorporated or not incorporated depending upon the particular application for the engine system 10.

The engine system 10 of FIG. 1 incorporates EGR and to that end a line 62 has a T connection with line 24. An EGR valve 26 is positioned within line 62 which extends through a cooler 64 and line 66 to connect with line 60 extending to intake manifold 14. EGR valve 26 may take a number of forms but has the functional capability of allowing more or less products of combustion from line 24 to be passed through line 62, cooler 64, and line 66 to the intake 14 of IC engine 12. The EGR valve 26 is actuated by control signals from a line 68 leading to an ECM 70 which may also provide control of the fuel system 16 via signal line 72.

The ECM 70 is programmed to control the valve 26 and variable geometry turbines to produce one of several control algorithms. The first group includes an $O_2$ (mole/mass) fraction, EGR fraction and diluent to air ratio which are measures of EGR The second group includes Lambda, Phi and exhaust $O_2$ (mole/mass fraction) which are measures of fresh air to fuel ratio. A typical control scheme would control to one of the EGR measures and one of the fresh air to fuel ratio measures. This can be done by controlling the EGR valve 26 and the variable geometry turbines 30 and/or 36. For all of these control logics, it is necessary to provide a measurement of the EGR flow through line 66. Heretofore, this measurement has been taken directly in line 66 or 62 with the attendant deficiencies described above.

In accordance with the present invention, the internal combustion engine system 10 incorporates the following novel EGR measurement. The total flow of gasses to engine 12 is calculated using the temperature and pressure at the intake manifold 14, measured by a sensor 74 and providing a signal to ECM 70 via line 76. This measurement provides an accurate and responsive measurement of the total flow of gasses consumed by engine 12. The fresh air flow is measured by any one of a number of flow sensors 78, 82, 84, and 86. The signal from any one of these locations is fed by lines indicated by dashed lines 88 to a signal line 90 extending to ECM 70. The flow sensors 78-86 may either be a venturi or orifice in which pressure, temperature, and differential pressure are used to calculate the air flow past a sensor. Although a venturi and orifice are described, it should be noted to those skilled in the art that other forms of flow sensors may also be employed. The signal from any one of the sensors 78-86 is fed to the ECM 70 which is configured to subtract the fresh air flow, as sensed by these flow sensors, from the total air flow as calculated by the ECM 70 to provide a signal representing the actual flow of gasses through the EGR lines 62 and 66.

Because the sensors are in the fresh air line, they are not subject to the adverse impact of pulsating flow when measuring in the EGR passages. This results in a signal that is significantly more stable and accurate than the prior methods of measuring flow actually in the EGR passages. It should be noted that any one of the locations for the sensors 78-86 may be selected depending upon the delta P ranges at that point and local velocity variations. The resultant system offers a significant increase in reliability and effectiveness. In addition, using the restriction in the fresh air line does not have the adverse impact on pumping losses that are found when measuring directly in the EGR loop.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of operating an air-breathing internal combustion (IC) engine having exhaust gas recirculation (EGR) and a device for controlling EGR, said method comprising the steps of:
   calculating the total flow of gasses consumed by said IC engine;
   measuring the actual fresh air flow to said engine;
   subtracting the actual fresh air flow from said total flow to provide a measure of EGR flow; and
   using said EGR flow as an input to said control device.

2. The method as claimed in claim 1 wherein said fresh air flow is measured at any point in the intake system of said engine prior to entry of said EGR.

3. The method as claimed in claim 1 wherein the fresh air flow is measured by one of an orifice and venturi.

4. The method as claimed in claim 1 wherein the EGR and air flow is controlled to provide at least one of selected $O_2$ (mole/mass) fraction, EGR fraction, diluent to air ratio, Lambda, Phi and exhaust $O_2$ (mole/mass) fraction measures.

5. A control system for an exhaust gas recirculation system (EGR) of an internal combustion (IC) engine, said system comprising:
   a device for controlling the flow of EGR in response to the differential of at least two input signals;
   a first device for calculating the total flow of gasses consumed by said IC engine and providing a signal proportional to said total gas flow to said flow control device; and
   a second device for measuring the fresh air flow to said IC engine and providing a signal proportional to said fresh air flow to said flow control device, whereby the difference between said total flow and said fresh air flow is the actual EGR flow.

6. The control system as claimed in claim 5 wherein the device for calculating the total flow of gasses has an input of at least intake temperature and pressure to said internal combustion engine.

7. The control system as claimed in claim 5 wherein said device for measuring the fresh air flow is one of an orifice and venturi.

8. The control system as claimed in claim 5 wherein said device for controlling the flow of EGR is an electronic control module (ECM).

9. The control system as claimed in claim 5 wherein the flow of EGR and air flow is controlled to provide at least one of selected $O_2$ (mole/mass) fraction, EGR fraction, diluent to air ratio, Lambda, Phi and exhaust $O_2$ (mole/mass) fraction measures.

10. The control system as claimed in claim 5 wherein said internal combustion engine has an intake system and at least one intake air processing device in said intake system and said second device for measuring the fresh air flow is positioned at any location in the engine intake system prior to the introduction of EGR.

11. The control system as claimed in claim 10 wherein said processing device is at least one turbocharger.

12. The control system as claimed in claim 11 further including a heat exchanger receiving the discharge from said turbocharger.

13. An internal combustion (IC) engine system comprising:
   an air-breathing IC engine having an intake air system for receiving gas for combustion and an exhaust for discharging products of combustion;
   a flow control device for selectively fluidly connecting a controlled percentage of the products of combustion to the intake air system of said IC engine;
   a device for actuating said flow control device and response to the differential of at least two input signals;
   a first device for calculating the total flow of gasses consumed by said IC engine and providing a signal proportional to said total gas flow to said flow control device; and
   a second device for measuring the fresh air flow to said IC engine and providing a signal proportional to said fresh air flow to said flow control device, whereby the difference between said total flow and said fresh air flow is the actual EGR flow.

14. The internal combustion engine system as claimed in claim 13 wherein said first device calculates the total flow of gasses to said engine by measuring at least intake gas temperature and pressure.

15. The internal combustion engine system of claim 13 wherein the second device for measuring air flow is one of an orifice and venturi.

16. The internal combustion engine system of claim 13 wherein said actuating device includes an electronic control module (ECM).

17. The internal combustion engine system of claim 13 wherein the EGR and air flow is controlled to provide at least one of selected $O_2$ (mole/mass) fraction, EGR fraction, diluent to air ratio, Lambda, Phi and exhaust $O_2$ (mole/mass) fraction measures.

18. The internal combustion engine system of claim 13 further comprising at least one intake processing device in said engine intake air system and said second device is positioned at any point in said intake air system prior to entry of the EGR.

19. The internal combustion engine system of claim 18 wherein said processing device is at least one turbocharger for pressurizing air.

20. The internal combustion engine system as claimed in claim 19 further including a heat exchanger adjacent the discharge of the fresh air compressor of said turbocharger.

21. The internal combustion engine system of claim 19 having a pair of turbochargers.

22. The internal combustion engine system of claim 21 including a pair of heat exchangers respectively receiving the output of the turbochargers.

* * * * *